(12) United States Patent
Doemling et al.

(10) Patent No.: US 11,391,590 B2
(45) Date of Patent: Jul. 19, 2022

(54) METHODS AND APPARATUS FOR SELECTING A MAP FOR A MOVING OBJECT, SYSTEM, AND VEHICLE/ROBOT

(71) Applicant: Bayerische Motoren Werke Aktiengesellschaft, Munich (DE)

(72) Inventors: Maximilian Doemling, Shanghai (CN); Sebastian Granzow, Kirchheim (DE); Wanli Jiang, Shanghai (CN); Qianshan Li, Shanghai (CN); Jianpeng Li, Suzhou (CN); Shuhan Lv, Shanghai (CN); Hongshan Xu, Shanghai (CN); Tao Xu, Shanghai (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 172 days.

(21) Appl. No.: 16/714,213

(22) Filed: Dec. 13, 2019

(65) Prior Publication Data

US 2020/0116517 A1 Apr. 16, 2020

Related U.S. Application Data

(63) Continuation of application No. PCT/CN2017/088768, filed on Jun. 16, 2017.

(51) Int. Cl.
*G01C 21/36* (2006.01)
*G05D 1/02* (2020.01)
(Continued)

(52) U.S. Cl.
CPC ......... *G01C 21/3602* (2013.01); *G01C 21/38* (2020.08); *G05D 1/0242* (2013.01);
(Continued)

(58) Field of Classification Search
CPC .............. G01C 21/00; G01C 21/28–32; G01C 21/38–3896; G01C 21/3602; G01D 1/00;
(Continued)

(56) References Cited

U.S. PATENT DOCUMENTS

2004/0122588 A1* 6/2004 Ito ........................ G01C 21/367
701/455
2007/0193798 A1* 8/2007 Allard .................. G05D 1/0061
180/169
(Continued)

FOREIGN PATENT DOCUMENTS

CN 102402225 A * 4/2012
CN 106541407 A 3/2017
(Continued)

OTHER PUBLICATIONS

Xiaojie Chai, English translation of CN-102402225-A via Espacenet Patent Translate, Jul. 16, 2021 (Year: 2021).*
(Continued)

*Primary Examiner* — Jeffrey C Boomer
*Assistant Examiner* — Paul Allen
(74) *Attorney, Agent, or Firm* — Crowell & Moring LLP

(57) ABSTRACT

A method and apparatus for selecting a map from a plurality of maps having different resolutions for a moving object includes dynamically selecting an appropriate map from maps having different levels of details according to environment information, such that a minimum amount of required map is loaded, thereby effectively improving the data processing efficiency of vehicles.

9 Claims, 4 Drawing Sheets

(51) Int. Cl.
  *G06F 17/16* (2006.01)
  *G01C 21/00* (2006.01)
(52) U.S. Cl.
  CPC ......... *G05D 1/0253* (2013.01); *G05D 1/0255* (2013.01); *G05D 1/0257* (2013.01); *G06F 17/16* (2013.01)
(58) Field of Classification Search
  CPC ....... B60W 60/00; G05D 1/00; G05D 1/0242; G05D 1/0253; G05D 1/0255; G05D 1/0257; G06F 17/16
  USPC .................................................. 701/400–541
  See application file for complete search history.

(56) References Cited

U.S. PATENT DOCUMENTS

| | | | |
|---|---|---|---|
| 2010/0070078 A1 | 3/2010 | Kong et al. | |
| 2014/0350839 A1* | 11/2014 | Pack | G05D 1/0214 701/409 |
| 2017/0307751 A1* | 10/2017 | Rohani | G01S 17/89 |
| 2017/0326739 A1* | 11/2017 | Nakazato | B25J 9/1612 |

FOREIGN PATENT DOCUMENTS

| | | |
|---|---|---|
| EP | 3106 836 A1 | 12/2016 |
| KR | 10-2014-0045848 A | 4/2014 |

OTHER PUBLICATIONS

Pizarro, D., Mazo, M., Santiso, E., Marron, M., Jimenez, D., Cobreces, S., & Losada, C. (2010). Localization of mobile robots using odometry and an external vision sensor. Sensors, 10(4), 3655-3680. doi:http://dx.doi.org/10.3390/s100403655 (Year: 2010).*
P. Payeur, "Dealing with uncertain measurements in virtual representations for robot guidance," 2002 IEEE International Symposium on Virtual and Intelligent Measurement Systems (IEEE Cat. No. 02EX545), 2002, pp. 56-61, doi: 10.1109/VIMS.2002.1009357. (Year: 2002).*
PCT/CN2017/088768, International Search Report dated Feb. 24, 2018 (Two (2) pages).

* cited by examiner

METHODS AND APPARATUS FOR SELECTING A MAP FOR A MOVING OBJECT, SYSTEM, AND VEHICLE/ROBOT

CROSS REFERENCE TO RELATED APPLICATION

This application is a continuation of PCT International Application No. PCT/CN2017/088768, filed Jun. 16, 2017, the entire disclosure of which is herein expressly incorporated by reference.

BACKGROUND AND SUMMARY OF THE INVENTION

This invention relates to the field of vehicle/robot localization. More specifically, the invention relates to methods and apparatus for selecting map from a plurality of maps having different resolutions for a moving object.

In recent years, highly and fully automated driving vehicles are rapidly evolving. The high-precision map for localization and navigation is one of the necessary technologies to automated driving applications. During a navigation process, the vehicle has to achieve a high level self-positioning accuracy by matching the map with the real-time scanned environmental data. In the prior art, it is generally necessary to load all of the high-precision maps within a certain range near the vehicle during the navigation process.

Disadvantages of the prior art for loading high-precision maps are obviously. On the one hand, the loading of the maps may be relatively slow. On the other hand, loading the high-precision maps for areas far from vehicles may decrease the efficiency of data processing, since vehicles have only limited data processing capacity, moreover the requirements for the accuracy of the map of an area are decreasing as the distance between the area and the vehicles increases.

In order to resolve the problems of the prior art, embodiments of the present invention provide methods, apparatus, system, and vehicle for selecting map from a plurality of maps having different resolutions for a moving object.

The embodiment of the present invention dynamically selects the appropriate map in a plurality of maps having different levels of details for a moving object, according to the localization information and the environment information, so as to realize the map with appropriate resolution is selected, and effectively improve the data processing efficiency of the moving object.

In accordance with a first aspect of the present invention, there is provided a method for selecting map from a plurality of maps having different resolutions for a moving object, the method comprising: obtaining step (110), obtaining localization information of the moving object; receiving step (120), receiving sensor data from a sensor; calculating step (130), calculating an uncertainty value representing the uncertainty of the sensor data; and selecting step (140), selecting a map from the plurality of maps having the different resolutions according to the localization information and the uncertainty value representing the uncertainty of the sensor data.

In accordance with a second aspect of the present invention, there is provided a second method for selecting map from a plurality of maps having different resolutions for a moving object, the method comprising: obtaining step (210), obtaining localization information of the moving object; receiving step (220), receiving sensor data representing an element in the environment from a sensor, wherein the sensor is mounted on the moving object; first calculating step (230), calculating the localization information of the element in the environment according to the localization information of the moving object and the sensor data; second calculating step (240), calculating an uncertainty value representing the uncertainty of the sensor data; and selecting step (250), selecting a map from the plurality of maps having the different resolutions according to the uncertainty value of the sensor data and the localization information of the element.

In accordance with a third aspect of the present invention, there is provided an apparatus for selecting map from a plurality of maps having different resolutions for a moving object, the apparatus comprising: an obtaining module (310), configured to obtain localization information of the moving object; a receiving module (320), configured to receive sensor data from a sensor; a calculating module (330), configured to calculate an uncertainty value representing the uncertainty of the sensor data; and a selecting module (340), configured to select a map from the plurality of maps having the different resolutions according to the localization information and the uncertainty value representing the uncertainty of the sensor data.

In accordance with a fourth aspect of the present invention, there is provided a second apparatus for selecting map from a plurality of maps having different resolutions for a moving object, the apparatus comprising: an obtaining module (410), configured to obtain localization information of the moving object; a receiving module (420), configured to receive sensor data representing an element in the environment from a sensor, wherein the sensor is mounted on the moving object; a first calculating module (430), configured to calculate the localization information of the element in the environment according to the localization information of the moving object and the sensor data; a second calculating module (440), configured to calculate an uncertainty value representing the uncertainty of the sensor data; and a selecting module (450), configured to select a map from the plurality of maps having the different resolutions according to the uncertainty value of the sensor data and the localization information of the element.

In accordance with a fifth aspect of the present invention, there is provided a system for selecting map from a plurality of maps having different resolutions for a moving object, comprising: at least one sensor, configured to detect environment and generate sensor data; and an apparatus according to the third aspect of the present invention; and/or an apparatus according to the fourth aspect of the present invention.

In accordance with a sixth aspect of the present invention, there is provided a vehicle/robot, comprising a system for selecting map from a plurality of maps having different resolutions for a moving object according to the fifth aspect of the present invention.

The foregoing summary is illustrative only and is not intended to be in any way limiting. In addition to the illustrative aspects, embodiments, and features described above, further aspects, embodiments, and features will become apparent by reference to the figures and the following detailed description.

Other objects, advantages and novel features of the present invention will become apparent from the following detailed description of one or more preferred embodiments when considered in conjunction with the accompanying drawings.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF THE DRAWINGS

Figure 1:
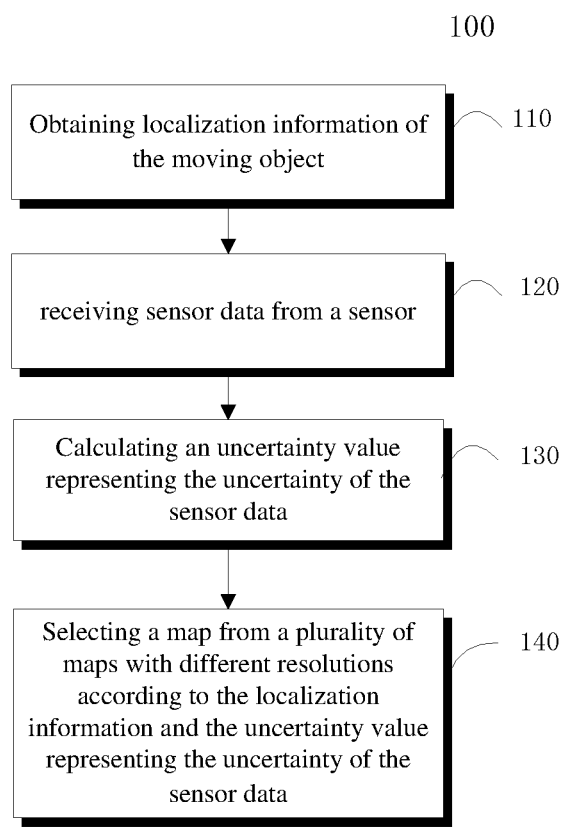
FIG. 1 illustrates a high level flow chart showing a method for selecting map from a plurality of maps having different resolutions for a moving object in accordance with an exemplary embodiment of the present disclosure.

To make the objectives, technical solutions, and advantages of the present invention clearer, the following further describes the embodiments of the present invention in detail with reference to the accompanying drawings. The illustrative embodiments described herein are not meant to be limiting.

In the embodiments of the present invention, a moving object may include but not limited to vehicles, robots and unmanned aerial vehicles (UAVs).

In one example embodiment of the present invention, a number of sensors may be mounted on a moving object, such as vehicle, robot and unmanned aerial vehicle (UAV). The sensors refer to units that are capable of obtaining environmental information. For instance, the sensors may include cameras, RADAR (Radio Detection And Ranging) units, ultra-sonic sensors, and LiDAR (Light Imaging, Detection, And Ranging) units.

The camera unit may be any camera, such as a still camera, a video camera, etc., that is configured to capture a plurality of images of the environment in which the vehicle is located. The camera may capable of recording images in the infrared, visible, and/or ultraviolet frequency ranges. The camera may be configured to generate a two-dimensional image indicating a distance and/or heading of the objects in the environment.

Radar unit may represent an object detection system that utilizes radio signals to sense objects. In some embodiments, in addition to sensing the objects, radar unit may additionally be configured to perform digital signal processing and may be configured to sense the range, altitude, speed and/or heading of the objects.

Ultrasonic sensor is developed by use of ultrasonic characteristics. Ultrasonic wave is a mechanical wave which vibration frequency is higher than the acoustic wave. Ultrasonic wave has a good direction, and can be transmitted directionally. The ultrasonic sensors mainly use direct reflection, for example, an object located in front of the sensor reflects the sound waves emitted from the sensor to the receiver of the sensor so that the object is detected by the sensor. In some embodiments, Ultrasonic sensor may be configured to detect the range and/or heading of the objects.

LiDAR is an optical remote sensing technology that can measure distance to, or other properties of, a target by illuminating the target with light, such as laser light. LiDAR can create a point cloud by measuring a large number of points on the surface of the object and output the point cloud as data. The laser data points of the point cloud may contain information indicative of the positions of objects in the environment relative to the sensor, and/or other information about the sensor's environment.

In some cases, the point cloud may be directly rendered to visualize the object. In other cases, the point cloud may be converted to polygon or triangle mesh models through surface reconstruction. These point cloud data that indicative of environmental information and are obtained by the sensor, are associated and combined with digital maps in a suitable manner to form map data. In some examples, the sensor data required for the map are collected by one or more specialist vehicles that travel along the road, and on which a particular number of sensors mounted.

In some embodiments, a plurality of maps with different levels of details is stored in a moving object. As an example, the levels of details here mean degrees of resolution representing the precision of maps. Resolution not only represents the precision of 2D (two-dimensional) objects such as figures and/or images in a map, but also represents the precision of 3D (three-dimensional) objects and/or map models created by algorithms, such as Gaussian Models. For instance, quadtrees may be representation of the resolution of 2D objects, and octrees may be representation of the resolution of 3D objects and map models. As an example, the resolution of maps may be predetermined as three levels of high, medium and low, but in other examples, the resolution may include more or fewer levels. Moreover, according to the uncertainty of all the map elements in the map having high resolution, for example, the uncertainty value $\sigma_H$ representing the uncertainty of the map with high resolution can be calculated. Similarly, $\sigma_M$ and $\sigma_L$ can be calculated. In some embodiments, the maps with the three different resolution are labeled with the above corresponding uncertainty values respectively, to provide references for subsequent selecting method. In other embodiments, the resolution of the maps may be directly represented by the uncertainty value of the corresponding map.

Turning to the figures, FIG. 1 is a high-level flow chart of a computer-implemented method 100 for selecting map from a plurality of maps having different resolutions for a moving object for a moving object in accordance with an exemplary embodiment of the present disclosure. Method 100 may be carried out by a vehicle, a robot, or a UAV, such as described below in the context.

At step 110, the method 100 may include obtaining the localization information of the vehicle by which the method 100 is carried out. The localization information may include the coordinates and orientation of the vehicle in a map coordinate system. For this information, a pose such as 3D pose or 6D pose may be used for indicating the coordinates and orientation. 3D pose consists of three parameters x, y and θ, wherein, x, y is the 2D coordinate representing the location, and θ is the heading angle representing the orientation. In some cases, a 6D pose including the parameters x, y, z, yaw, pitch, roll may be used, where x, y, z are the 3D position coordinates, yaw, pitch, roll represent the yaw angle, the pitch angle and the roll angle.

At step 120, the method 100 may include receiving sensor data representing an element in the environment from a sensor. The sensor is used to scan the surrounding environment in real time. Using sensors that can provide pose data is preferable, for example, laser scanners such as LiDAR, cameras, RADAR, and ultrasonic sensors and so on. The sensor data received from LiDAR and/or other sensors represent features of objects, and/or abstract data models. Then, the localization information of the element in the environment will be calculated based on the coordinates of the vehicle and the sensor data received. The sensor data may include coordinates and orientation of environmental elements. These coordinates and orientation will be automatically mapped to a two-dimensional vehicle coordinate as a 3D pose according to a configuration of the sensors. In the vehicle coordinate, for instance, the vehicle central point may be defined as a vehicle coordinate origin, a +x axis extends towards the moving direction of the vehicle, a +y axis extends towards the left direction of the moving direction, and the plane of the vehicle coordinate is in parallel with earth. The configuration of the sensors records coordinates where the sensors are mounted on the vehicle in the vehicle coordinate. In some embodiments, when a movable object, such as humans, animals, vehicles and so on is scanned by the sensors, the coordinates indicate the location of the object, the orientation indicates the direction where the object is facing to or moving to. When a fixed object is scanned by the sensors, if the object is non-rotational symmetric, such as houses, trees, traffic signs and so on, the orientation of the object may be defined based on needs; and if the object is rotational symmetric, the orientation of the object is insignificant, therefore, the orientation may be set to any value such as zero.

At step 130, the method 100 further includes calculating a pose P of the sensor data in a map coordinate system. The coordinates of vehicle is updated synchronously with the movement of the vehicle in real time. The raw observation of the sensor data is represented in a vehicle coordinate system. For the sake of convenience, it is assumed that the pose P of the sensor data in a map coordinate system is:

$$P = \begin{bmatrix} x \\ y \\ \theta \end{bmatrix} \quad (1)$$

the vehicle pose $P_S$ in the map coordinate system is:

$$P_S = \begin{bmatrix} x_S \\ y_S \\ \theta_S \end{bmatrix} \quad (2)$$

and, the raw observation of the sensor data in the vehicle coordinate system as $\check{P}$:

$$\check{P} = \begin{bmatrix} \check{x} \\ \check{y} \\ \check{\theta} \end{bmatrix} \quad (3)$$

Then the P can be derived by:

$$P = R\check{P} + P_S \quad (4)$$

wherein, $$R = \begin{bmatrix} \cos\theta_S & -\sin\theta_S & 0 \\ \sin\theta_S & \cos\theta_S & 0 \\ 0 & 0 & 1 \end{bmatrix} \quad (5)$$

The step 130 further includes constructing a covariance matrix of the pose of the sensor data. The covariance matrix $\Sigma$ of the P is calculated by $$\Sigma = J_1 \check{\Sigma} J_1^T + J_2 \Sigma_S J_2^T \quad (6)$$

wherein $\check{\Sigma}$ and $\Sigma_S$ are the covariance matrixes of $\check{P}$ and $P_S$ respectively, and $$J_1 = R \quad (8)$$

$$J_2 = \begin{bmatrix} 1 & 0 & -\sin\theta_S \check{x} - \cos\theta_S \check{y} \\ 0 & 1 & \cos\theta_S \check{x} - \sin\theta_S \check{y} \\ 0 & 0 & 1 \end{bmatrix} \quad (7)$$

Next, a maximum eigenvalue of the covariance matrix $\Sigma$ is calculated. Finally, the maximum eigenvalue is set to be the uncertainty value $\sigma_P$ of the sensor data.

Referring back to FIG. 1, at step 140, the method 100 may include selecting a map from a plurality of maps with different resolutions according to the localization information of the moving object and the uncertainty value representing the uncertainty of the sensor data. In some embodiments, according to the coordinates of the vehicle, maps within a maximum range such as 200 meters around the vehicle will be selected firstly. Further, according to the uncertainty value $\sigma_P$, a map with appropriate resolution will be selected from the above selected maps.

As one example, when the requirement for the resolution of the map is priority, the method 100 may select the map that its uncertainty value is closest to $\sigma_P$ from the maps with different resolution.

In another example, the method 100 may select the map that its uncertainty value is closest to $\sigma_P$ and less than $\sigma_P$. In this way, data processing resources can be effectively saved, while ensuring the resolution of the map meets the needs.

In some embodiments, it is possible that multiple maps are selected because a plurality of sensor data having different uncertainty values may be received.

Figure 2:
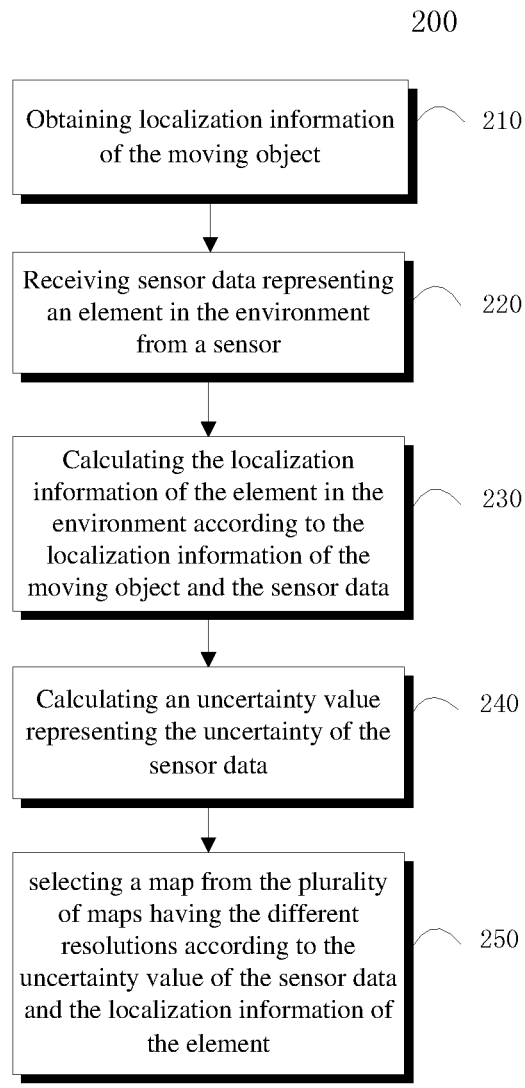
FIG. 2 illustrates a high level flow chart showing a method for selecting map from a plurality of maps having different resolutions for a moving object in accordance with a second exemplary embodiment of the present disclosure.

FIG. 2 is a high-level flow chart of a computer-implemented method 200 for selecting map from a plurality of maps having different resolutions for a moving object for a moving object in accordance with a second exemplary embodiment of the present disclosure. Method 200 may be carried out by a vehicle, a robot, or a UAV, such as described below in the context.

Step 210 is as the same as the step 110, so that the description of step 210 is omitted.

At step 220, the method 200 may include receiving sensor data representing an element in the environment from a sensor. The sensor is used to scan the surrounding environment in real time. Using sensors that can provide pose data is preferable, for example, laser scanners such as LiDAR, cameras, RADAR, and ultrasonic sensors and so on. The sensor data received from LiDAR and/or other sensors represent features of objects, and/or abstract data models.

Then, at step 230, the localization information of the element in the environment will be calculated based on the coordinates of the vehicle and the sensor data received. The sensor data may include coordinates and orientation of environmental features. These coordinates and orientation will be automatically mapped to a two-dimensional vehicle coordinate as a 3D pose according to a configuration of the sensors. In the vehicle coordinate, for instance, the vehicle central point may be defined as a vehicle coordinate origin, a +x axis extends towards the moving direction of the vehicle, a +y axis extends towards the left direction of the moving direction, and the plane of the vehicle coordinate is in parallel with earth. The configuration of the sensors records coordinates where the sensors are mounted on the vehicle in the vehicle coordinate. In some embodiments, when a movable object, such as humans, animals, vehicles and so on is scanned by the sensors, the coordinates indicate the location of the object, the orientation indicates the direction where the object is facing to or moving to. When a fixed object is scanned by the sensors, if the object is non-rotational symmetric, such as houses, trees, traffic signs and so on, the orientation of the object may be defined based on needs; and if the object is rotational symmetric, the orientation of the object is insignificant, therefore, the orientation may be set to any value such as zero.

Step 240 is as the same as the step 130, so that the description of step 240 is omitted.

Referring back to FIG. 2, at step 250, method 200 may include selecting a map from the plurality of maps having the different resolutions according to the uncertainty value of the sensor data and the localization information of the element. Step 140 and step 250 are basically the same, but instead of the coordinates of the vehicle, the pose P is used in step 250. That is, according to the coordinates of the element, maps within a maximum range such as 200 meters around the element will be selected firstly. Further, according to the uncertainty value $\sigma_P$, a map with appropriate resolution will be selected from the above selected maps.

Figure 3:
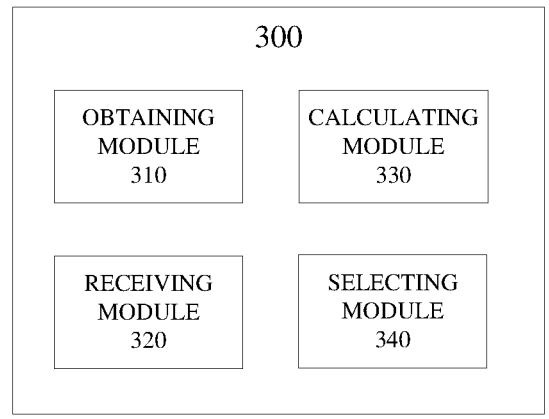
FIG. 3 illustrates an apparatus for selecting map from a plurality of maps having different resolutions for a moving object in accordance with an exemplary embodiment of the present disclosure.

FIG. 3 illustrates an apparatus for selecting map from a plurality of maps having different resolutions for a moving object in accordance with an exemplary embodiment of the present invention.

The apparatus 300 may comprise an obtaining module 310, configured to obtain localization information of the moving object; a receiving module 320, configured to receive sensor data from a sensor; a calculating module 330, configured to calculate an uncertainty value representing the uncertainty of the sensor data; and a selecting module 340, configured to select a map from the plurality of maps having the different resolutions according to the localization information and the uncertainty value representing the uncertainty of the sensor data.

It should be understood that the obtaining module 310, the receiving module 320, the calculating module 330, and the selecting module 340 of the apparatus 300 can be configured to perform corresponding operations, actions and processes in method 100, and such operations, actions and processes are omitted herein.

Figure 4:
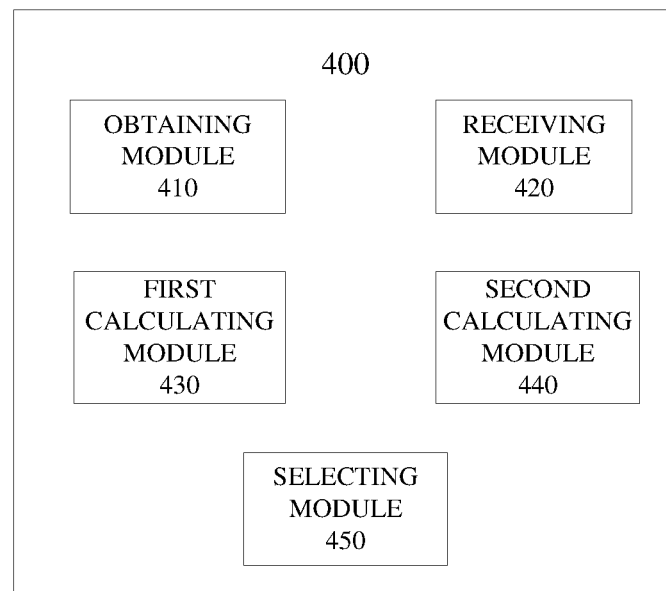
FIG. 4 illustrates an apparatus for selecting map from a plurality of maps having different resolutions for a moving object in accordance with a second exemplary embodiment of the present disclosure.

FIG. 4 illustrates a second apparatus for selecting map from a plurality of maps having different resolutions for a moving object in accordance with a second exemplary embodiment of the present invention.

The apparatus 400 may comprise an obtaining module 410, configured to obtain localization information of the moving object; a receiving module 420, configured to receive sensor data representing an element in the environment from a sensor, wherein the sensor is mounted on the moving object; a first calculating module 430, configured to calculate the localization information of the element in the environment according to the localization information of the moving object and the sensor data; a second calculating module 440, configured to calculate an uncertainty value representing the uncertainty of the sensor data; and a selecting module 450, configured to select a map from the plurality of maps having the different resolutions according to the uncertainty value of the sensor data and the localization information of the element.

It should be understood that the obtaining module 410, the receiving module 420, the first calculating module 430, the second calculating module 440, and the selecting module 450 of the apparatus 400 can be configured to perform corresponding operations, actions and processes in method 200, and such operations, actions and processes are omitted herein.

Further, according to an exemplary embodiment of the present invention, a system for selecting map from a plurality of maps having different resolutions for a moving object may be provided, the system may comprise the apparatus 300 and/or the apparatus 400 as described above, and at least one sensor, configured to detect environment and generate sensor data. The sensors refer to units that are capable of obtaining environmental information. For instance, the sensors may include cameras, RADAR (Radio Detection And Ranging) units, ultra-sonic sensors, and LiDAR (Light Imaging, Detection, And Ranging) units. Preferably, the system may use the LiDAR units as detailed described in the above embodiments.

Further, the exemplary system provided by the present invention may be implemented on a moving object such as vehicle/robot. These vehicles/robots include but are not limited to cars, trucks, motorcycles, buses, boats, airplanes, helicopters, recreational vehicles, amusement park vehicles, agricultural equipment, construction equipment, golf carts, trains, trams, industrial robots and home robots.

Further, in accordance with an embodiment of the disclosure, a non-transient storage medium having instructions stored thereon that when executed cause a processor to implement computer-implemented methods for selecting map from a plurality of maps having different resolutions for a moving object. A method comprising: obtaining step, obtaining localization information of the moving object; receiving step, receiving sensor data from a sensor; calculating step, calculating an uncertainty value representing the uncertainty of the sensor data; and selecting step, selecting a map from the plurality of maps having the different resolutions according to the localization information and the uncertainty value representing the uncertainty of the sensor data. The other method comprising: obtaining step, obtaining localization information of the moving object; receiving step, receiving sensor data from a sensor; calculating step, calculating an uncertainty value representing the uncertainty of the sensor data according to the localization information; first calculating step, calculating the localization information of the element in the environment according to the localization information of the moving object and the sensor data; second calculating step, calculating an uncertainty value representing the uncertainty of the sensor data; and selecting step, selecting a map from the plurality of maps having the different resolutions according to the uncertainty value of the sensor data and the localization information of the element.

Further, in accordance with an embodiment of the disclosure, an apparatus for selecting map from a plurality of maps having different resolutions for a moving object, comprising a memory which has computer executable instructions stored therein; and a processor, coupled to the memory and configured to conduct processes. One comprising, obtaining localization information of the moving object; receiving sensor data from a sensor; calculating an uncertainty value representing the uncertainty of the sensor data; and selecting a map from the plurality of maps having the different resolutions according to the localization information and the uncertainty value representing the uncertainty of the sensor data. The other comprising, obtaining localization information of the moving object; receiving sensor data representing an element in the environment from a sensor, wherein the sensor is mounted on the moving object; calculating the localization information of the element in the environment according to the localization information of the moving object and the sensor data; calculating an uncertainty value representing the uncertainty of the sensor data; and selecting a map from the plurality of maps having the different resolutions according to the uncertainty value of the sensor data and the localization information of the element.

Figure 5:
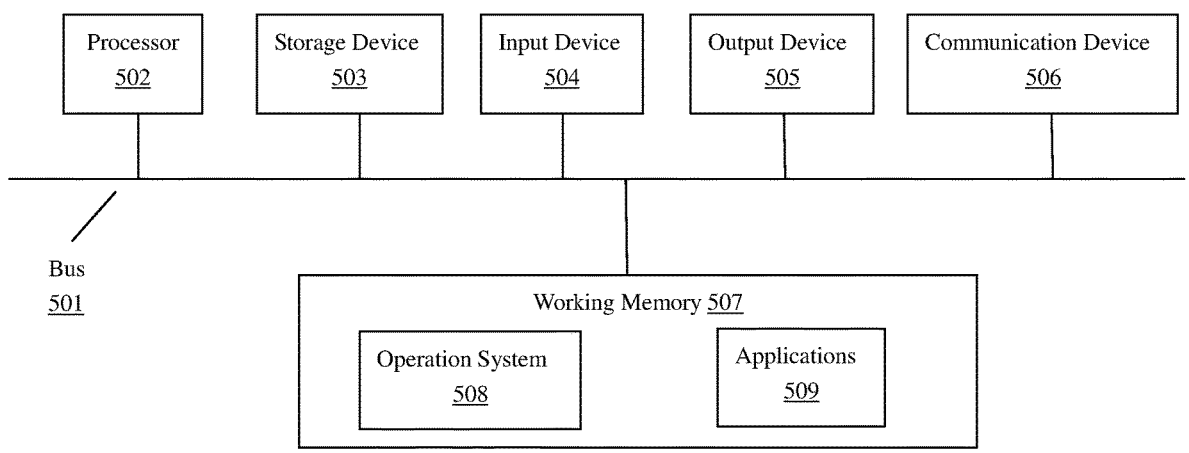
FIG. 5 illustrates a block diagram of computing device which is an example of the hardware device that may be applied to the aspects of the present disclosures in accordance with an exemplary embodiment of the present disclosure.

FIG. 5 illustrates a block diagram of computing device which is an example of the hardware device that may be applied to the aspects of the present disclosures in accordance with an exemplary embodiment of the present disclosure.

With reference to FIG. 5, a computing device 500, which is an example of the hardware device that may be applied to the aspects of the present disclosures, will now be described. The computing device 500 may be any machine configured to perform processing and/or calculations, may be but is not limited to a work station, a server, a desktop computer, a laptop computer, a tablet computer, a personal data assistant, a smart phone, an on-vehicle computer or any in combination. The aforementioned various apparatuses/server/client devices may be wholly or at least partially implemented by the computing device 500 or a similar device or system.

The computing device 500 may comprise elements that are connected with or in communication with a bus 501, possibly via one or more interfaces. For example, the computing device 500 may comprise the bus 501, and one or more processors 502, one or more input devices 504 and one or more output devices 505. The one or more processors 502 may be any kinds of processors, and may comprise but are not limited to one or more general-purpose processors and/or one or more special-purpose processors (such as special processing chips). The input devices 504 may be any kinds of devices that can input information to the computing device, and may comprise but are not limited to a mouse, a keyboard, a touch screen, a microphone and/or a remote control. The output devices 505 may be any kinds of devices that can present information, and may comprise but are not limited to display, a speaker, a video/audio output terminal, a vibrator and/or a printer. The computing device 500 may also comprise or be connected with non-transitory storage devices 503 which may be any storage devices that are non-transitory and can implement data stores, and may comprise but are not limited to a disk drive, an optical storage device, a solid-state storage, a floppy disk, a flexible disk, hard disk, a magnetic tape or any other magnetic medium, a compact disc or any other optical medium, a ROM (Read Only Memory), a RAM (Random Access Memory), a cache memory and/or any other memory chip or cartridge, and/or any other medium from which a computer may read data, instructions and/or code. The non-transitory storage devices 503 may be detachable from an interface. The non-transitory storage devices 503 may have data/instructions/code for implementing the methods and steps which are described above. The computing device 500 may also comprise a communication device 506. The communication device 506 may be any kinds of device or system that can enable communication with external apparatuses and/or with a network, and may comprise but are not limited to a modem, a network card, an infrared communication device, a wireless communication device and/or a chipset such as a Bluetooth™ device, 1302.11 device, WiFi device, WiMax device, cellular communication facilities and/or the like.

When the computing device 500 is used as an on-vehicle device, it may also be connected to external device, for example, a GPS receiver, sensors for sensing different environmental data such as an acceleration sensor, a wheel speed sensor, a gyroscope and so on. In this way, the computing device 500 may, for example, receive location data and sensor data indicating the travelling situation of the vehicle. When the computing device 500 is used as an on-vehicle device, it may also be connected to other facilities (such as an engine system, a wiper, an anti-lock Braking System or the like) for controlling the traveling and operation of the vehicle.

In addition, the non-transitory storage devices 503 may have map information and software elements so that the processor 502 may perform route guidance processing. In addition, the output device 505 may comprise a display for displaying the map, the location mark of the vehicle and also images indicating the travelling situation of the vehicle. The output device 505 may also comprise a speaker or interface with an ear phone for audio guidance.

The bus 501 may include but is not limited to Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Particularly, for an on-vehicle device, the bus 501 may also include a Controller Area Network (CAN) bus or other architectures designed for application on an automobile.

The computing device 500 may also comprise a working memory 507, which may be any kind of working memory that may store instructions and/or data useful for the working of the processor 502, and may comprise but is not limited to a random access memory and/or a read-only memory device.

Software elements may be located in the working memory 507, including but are not limited to an operating system 508, one or more application programs 509, drivers and/or other data and codes. Instructions for performing the methods and steps described in the above may be comprised in the one or more application programs 509, and the means/units/elements of the aforementioned various apparatuses/server/client device may be implemented by the processor 502 reading and executing the instructions of the one or more application programs 509.

It should also be appreciated that variations may be made in accordance with specific requirements. For example, customized hardware might also be used, and/or particular elements might be implemented in hardware, software, firmware, middleware, microcode, hardware description languages, or any combination thereof. Further, connection to other computing devices such as network input/output devices may be employed. For example, some or all of the disclosed methods and devices may be implemented by programming hardware (for example, a programmable logic circuitry including field-programmable gate arrays (FPGA) and/or programmable logic arrays (PLA)) with an assembler language or a hardware programming language (such as VERILOG, VHDL, C++) by using the logic and algorithm according to the present disclosure.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A computer-implemented method for route guidance processing with respect to a moving object, the method comprising:
    obtaining localization information of the moving object, wherein the localization information of the moving object is represented by a moving object pose that includes a two dimensional location and a heading angle;
    receiving sensor data from a sensor of the moving object, wherein the sensor data represents a further object in an environment of the moving object;
    calculating an uncertainty value representing an uncertainty of the sensor data, wherein the uncertainty value is calculated according to the pose of the moving object, and wherein calculating the uncertainty value comprises:
        calculating a further object pose in a map coordinate system, wherein the further object pose is calculated by $P=R\breve{P}+P_s$, where $$P = \begin{bmatrix} x \\ y \\ \theta \end{bmatrix}$$

is the further object pose, $$\breve{P} = \begin{bmatrix} \breve{x} \\ \breve{y} \\ \breve{\theta} \end{bmatrix}$$

is the raw observation of the further object pose in a moving object coordinate system, $$P_S = \begin{bmatrix} x_s \\ y_s \\ \theta_s \end{bmatrix}$$

is the pose of the moving object in the map coordinate system and $$R = \begin{bmatrix} \cos\theta_s & -\sin\theta_s & 0 \\ \sin\theta_s & \cos\theta_s & 0 \\ 0 & 0 & 1 \end{bmatrix},$$

constructing a covariance matrix of the further object pose, such that the covariance matrix of the further object pose is $\Sigma = J_1 \breve{\Sigma} J_1^T + J_2 \Sigma_s J_2^T$, where $\Sigma$ is the covariance matrix of $\breve{P}$, $\Sigma_s$ is the covariance matrix of $P_s$, $\Sigma$ is the covariance matrix of P, $J_1=R$, and $$J_2 = \begin{bmatrix} 1 & 0 & -\sin\theta_s\breve{x} - \cos\theta_s\breve{y} \\ 0 & 1 & \cos\theta_s\breve{x} - \sin\theta_s\breve{y} \\ 0 & 0 & 1 \end{bmatrix},$$

calculating a maximum eigenvalue of the covariance matrix of the further object pose, and
setting the uncertainty value to the maximum eigenvalue;
selecting and loading a digital map of the environment from among a plurality of digital maps of the environment stored in a memory of the moving object, wherein each of the plurality of digital maps has a different resolution, and wherein the digital map is selected for loading according to the localization information of the moving object and the uncertainty value; and
navigating the moving object, via the route guidance processing, based on the loaded digital map.

2. The method according to claim 1, wherein selecting the map from the plurality of maps further comprises:
    selecting maps representing an area around the moving object according to the localization information of the moving object; and
    selecting the map which uncertainty value representing the uncertainty of the map is closest to the uncertainty value representing the uncertainty of the sensor data from said selected maps.

3. The method according to claim 1, wherein selecting the map from the plurality of maps further comprises:
    selecting maps representing an area around the moving object according to the localization information of the moving object; and
    selecting the map which uncertainty value representing the uncertainty of the map is closest to and less than the uncertainty value representing the uncertainty of the sensor data from said selected maps.

4. A computer-implemented method for route guidance processing with respect to a moving object, the method comprising:
    obtaining localization information of the moving object, wherein the localization information of the moving object is represented by a moving object pose that includes a two dimensional location and a heading angle;
    receiving sensor data representing an element in an environment of the moving object from a sensor mounted on the moving object;
    calculating localization information of the element according to the localization information of the moving object and the sensor data;

calculating an uncertainty value representing an uncertainty of the sensor data, wherein the uncertainty value is calculated according to the pose of the moving object, and wherein calculating the uncertainty value comprises:

calculating an element pose in a map coordinate system, wherein the element pose is calculated by $P=R\breve{P}+P_s$, where $$P = \begin{bmatrix} x \\ y \\ \theta \end{bmatrix}$$

is the element pose, $$\breve{P} = \begin{bmatrix} \breve{x} \\ \breve{y} \\ \breve{\theta} \end{bmatrix}$$

is the raw observation of the element pose in a moving object coordinate system, $$P_S = \begin{bmatrix} x_s \\ y_s \\ \theta_s \end{bmatrix}$$

is the pose of the moving object in the map coordinate system and $$R = \begin{bmatrix} \cos\theta_s & -\sin\theta_s & 0 \\ \sin\theta_s & \cos\theta_s & 0 \\ 0 & 0 & 1 \end{bmatrix},$$

constructing a covariance matrix of the element pose, such that the covariance matrix of the element pose is $\Sigma = J_1\breve{\Sigma}J_1^T + J_2\Sigma_S J_2^T$, where $\breve{\Sigma}$ is the covariance matrix of $\breve{P}$, $\Sigma_s$ is the covariance matrix of $P_s$, $\Sigma$ is the covariance matrix of P, $J_1=R$, and $$J_2 = \begin{bmatrix} 1 & 0 & -\sin\theta_s\breve{x} - \cos\theta_s\breve{y} \\ 0 & 1 & \cos\theta_s\breve{x} - \sin\theta_s\breve{y} \\ 0 & 0 & 1 \end{bmatrix},$$

calculating a maximum eigenvalue of the covariance matrix of the element pose, and setting the uncertainty value to the maximum eigenvalue;

selecting and loading a digital map of the environment from among a plurality of digital maps of the environment stored in a memory of the moving object, wherein each of the plurality of digital maps has a different resolution, and wherein the digital map is selected for loading according to the uncertainty value and the localization information of the element.

5. The method according to claim 4, wherein selecting the map from the plurality of maps further comprises:

selecting maps representing an area around the element according to the localization information of the element; and selecting the map which uncertainty value representing the uncertainty of the map is closest to the uncertainty value representing the uncertainty of the sensor data from said selected maps.

6. The method according to claim 4, wherein selecting the map from the plurality of maps further comprises:

selecting maps representing an area around the element according to the localization information of the element; and selecting the map which uncertainty value representing the uncertainty of the map is closest to and less than the uncertainty value representing the uncertainty of the sensor data from said selected maps.

7. An apparatus configured for route guidance processing with respect to a moving object, the apparatus comprising:

an obtaining module configured to obtain localization information of the moving object, wherein the localization information of the moving object is represented by a moving object pose that includes a two dimensional location and a heading angle;

a receiving module configured to receive sensor data from a sensor of the moving object, wherein the sensor data represents a further object in an environment of the moving object;

a calculating module configured to calculate an uncertainty value representing the uncertainty of the sensor data, wherein the uncertainty value is calculated according to the pose of the moving object, and wherein calculating the uncertainty value comprises:

calculating a further object pose in a map coordinate system, wherein the further object pose is calculated by $P=R\breve{P}+P_s$, where $$P = \begin{bmatrix} x \\ y \\ \theta \end{bmatrix}$$

is the further object pose, $$\breve{P} = \begin{bmatrix} \breve{x} \\ \breve{y} \\ \breve{\theta} \end{bmatrix}$$

is the raw observation of the further object pose in a moving object coordinate system, $$P_S = \begin{bmatrix} x_s \\ y_s \\ \theta_s \end{bmatrix}$$

is the pose of the moving object in the map coordinate system and $$R = \begin{bmatrix} \cos\theta_s & -\sin\theta_s & 0 \\ \sin\theta_s & \cos\theta_s & 0 \\ 0 & 0 & 1 \end{bmatrix},$$

constructing a covariance matrix of the further object pose, such that the covariance matrix of the further object pose is $\Sigma = J_1 \check{\Sigma} J_1^T + J_2 \Sigma_S J_2^T$, where $\check{\Sigma}$ is the covariance matrix of $\check{P}$, $\Sigma_s$ is the covariance matrix of $P_s$, $\Sigma$ is the covariance matrix of P, $J_1 = R$, and $$J_2 = \begin{bmatrix} 1 & 0 & -\sin\theta_s \check{x} - \cos\theta_s \check{y} \\ 0 & 1 & \cos\theta_s \check{x} - \sin\theta_s \check{y} \\ 0 & 0 & 1 \end{bmatrix},$$

calculating a maximum eigenvalue of the covariance matrix of the further object pose, and
setting the uncertainty value to the maximum eigenvalue; and
a selecting module configured to select for loading a digital map of the environment from among a plurality of digital maps of the environment stored in a memory of the moving object, wherein each of the plurality of digital maps has a different resolution, and wherein the digital map is selected for loading according to the localization information of the moving object and the uncertainty value; and a navigation unit configured to navigate the moving object, via the route guidance processing, based on the loaded digital map.

8. The apparatus according to claim 7, wherein the selecting module further comprises:
a first selecting unit configured to select maps representing an area around the moving object according to the localization information of the moving object; and
a second selecting unit configured to select the map which uncertainty value representing the uncertainty of the map is closest to the uncertainty value representing the uncertainty of the sensor data from said selected maps.

9. The apparatus according to claim 7, wherein the selecting module further comprises:
a first selecting unit configured to select maps representing an area around the moving object according to the localization information of the moving object and
a third selecting unit configured to select the map which uncertainty value representing the uncertainty of the map is closest to and less than the uncertainty value representing the uncertainty of the sensor data from said selected maps.

* * * * *